United States Patent [19]

Horibe et al.

[11] Patent Number: 5,427,514
[45] Date of Patent: Jun. 27, 1995

[54] MAGNETIC PLASTIC ROTOR DISK MANUFACTURING APPARATUS

[75] Inventors: Kinya Horibe; Masazumi Kawai; Yasukazu Hoshino; Koichiro Tsuji; Kiyofumi Uchida, all of Shizuoka, Japan

[73] Assignee: Yazaki Corporation, Tokyo, Japan

[21] Appl. No.: 201,155

[22] Filed: Feb. 24, 1994

Related U.S. Application Data

[63] Continuation-in-part of Ser. No. 996,857, Dec. 21, 1992, abandoned, which is a continuation of Ser. No. 762,056, Sep. 19, 1991, abandoned, which is a continuation of Ser. No. 342,790, Apr. 25, 1989, abandoned.

[30] Foreign Application Priority Data

Apr. 28, 1988 [JP] Japan .................. 63-104167

[51] Int. Cl.[6] .............................. B29C 45/32
[52] U.S. Cl. ........................ 425/3; 425/174; 425/563; 425/572; 425/573
[58] Field of Search .............. 425/3, 174, 562, 563, 425/572, 573

[56] References Cited

U.S. PATENT DOCUMENTS

| | | | |
|---|---|---|---|
| 4,441,875 | 4/1984 | Saito et al. | 425/3 |
| 4,643,665 | 2/1987 | Zeiger | 425/563 |
| 4,752,199 | 6/1988 | Arai | 264/328.8 |

OTHER PUBLICATIONS

Injection Molding Handbook, pp. 183–186, 1986.

*Primary Examiner*—Tim Heitbrink
*Attorney, Agent, or Firm*—Armstrong, Westerman, Hattori, McLeland & Naughton

[57] ABSTRACT

A magnetic plastic rotor disk manufacturing apparatus, includes an injection device for injecting a magnetic plastic material containing a synthetic resin matrix and a magnetic powder; a mold for molding the magnetic plastic material injected thereinto from the injection device, and a device for generating a magnetic field and magnetizing the magnetic powder in a direction along a diameter of the magnetic plastic rotor disks. The mold includes a three-plate type mold constructed of two retainer plates and a single runner stripper plate. One of the retainer plates is formed with a plurality of pin gates corresponding to the cavities so as to supply the magnetic plastic material through the pin gates into the cavities.

4 Claims, 5 Drawing Sheets

MAGNETIC PLASTIC ROTOR DISK MANUFACTURING APPARATUS

This application is a continuation-in-part of application Ser. No. 07/996,857, filed Dec. 21, 1992, now abandoned, which is a continuation of application Ser. No. 07/762,056, filed Sep. 19, 1991, now abandoned, which is a continuation of application Ser. No. 07/342,790, filed Apr. 25, 1989, now abandoned.

BACKGROUND OF THE INVENTION

The present invention relates to an apparatus for manufacturing magnetic plastic rotor disks, and more particularly to such an apparatus suitable for production of flattened columnar magnetic plastic rotor disks to be used as meter rotors, for example.

Such a magnetic plastic rotor disk is conventionally used for a vehicle meter such as a vehicle speed meter and an engine speed meter for indicating rotating speeds corresponding to a vehicle speed and rotational frequency of the engine thereof. FIG. 4 shows a magnetic plastic rotor disk b having a central rotary shaft a and magnetized in one direction perpendicular to the rotary shaft a to have an N-pole and an S-pole at diametrically opposite positions. The magnetic plastic rotor disk b is required to have a characteristic as shown in FIG. 5 wherein distribution of a magnetic flux density on an outer circumferential surface of the magnetic plastic rotor disk b varies sinusoidally with respect to a rotary angle of the magnetic plastic rotor disk b.

FIG. 6 shows a conventional apparatus for manufacturing such a magnetic plastic rotor disk. Referring to FIG. 6, a magnetic plastic material A containing a plastic matrix and a magnetic powder is injected from an injection device B through a sprue and runner D formed in a two-plate side gate type mold C into a plurality of cavities E. A reference numeral F designates a yoke around which a coil (not shown) is wound. The yoke F is so located as to surround a parting surface C' of the mold C, so that a magnetic field is applied to the magnetic plastic material A injected into the cavities in one direction as shown in FIG. 7 to thereby magnetize the magnetic powder contained in the material A so that the particles of the magnetic powder are magnetized in the same magnetic orientation.

However, since this conventional magnetic plastic rotor disk manufacturing apparatus is of a side gate type having two plates, a gate burr remarkably appears on the external surfaces of the magnetic plastic rotor disk after molding, causing turbulence of the distribution of the surface magnetic flux density of the magnetic plastic rotor disk. As a result, a desired characteristic of the magnetic plastic rotor disk cannot be obtained. Accordingly, it is necessary to conduct a deflashing process after a gate cutting process. Further, if the magnetic plastic rotor disk is in a magnetized condition in the deflashing process, small flash particles generated in the deflashing process will be magnetically attached to the rotor disk. Therefore, it is necessary demagnetize the rotor disk before the deflashing process and then magnetize the same again after the deflashing process. Thus, many troublesome processes are necessary after molding in the prior art device, causing an increase in production cost.

SUMMARY OF THE INVENTION

It is an object of the present invention to provide a magnetic plastic rotor disk manufacturing apparatus which may eliminate the necessity of the aforementioned troublesome processes after molding of the magnetic plastic material.

According to the present invention, there is provided an apparatus for manufacturing magnetic plastic rotor disks, comprising an injection device for injecting a magnetic plastic material containing a synthetic resin matrix and a magnetic powder; a mold for molding the magnetic plastic material injected thereinto from the injection device, the mold comprising a three-plate type mold constructed of two retainer plates and a single runner stripper plate, one of the retainer plates being formed with a plurality cavities, while the other retainer plate being formed with a plurality of pin gates corresponding to the cavities so as to supply the magnetic plastic material through the pin gates into the cavities; and means for generating a magnetic field and magnetizing the magnetic powder in a direction a long a diameter of the magnetic plastic rotor disk.

In the above-mentioned manufacturing apparatus, one of opposite end surfaces of each magnetic rotor disk having a columnar shape is molded by each cavity formed on one of the two retainer plates, and the pin gates are formed in the other retainer plate in such a manner as to be connected with the cavities. With this arrangement, when the mold is opened to split the two retainer plates form each other, the pin gates are automatically cut with greatly small gate blush remaining. Accordingly, it is unnecessary to conduct the gate cutting process and the gate blush removing process after molding of the magnetic plastic material. Since the gate blush removing process is unnecessary, it is not necessary to remove the magnetism of the moldings and magnetize the moldings again. Therefore, magnetic characteristic of the magnetic plastic rotor disks may be improved, and a production cost may also be greatly reduced.

Furthermore, the injection device is preferably constructed of a screw injection device having a screw head provided with a check valve for preventing back-flow of the magnetic plastic material. Accordingly, although an injection force is enlarged by the use of pin gates, the back flow of the material upon injection may be prevented. As a result, a cushion quantity may be ensured to greatly improve shot scattering of the material into the cavities, thereby improving the quality and magnetic characteristic of the moldings.

Other objects and features of the invention will be more fully understood from the following detailed description and appended claims when taken with the accompanying drawings.

BRIEF DESCRIPTION OF THE DRAWINGS

FIG. 8B is an illustration of the magnetic plastic rotor disk (e.g., a four-pole magnet type) of this invention showing that the pin gates are formed where magnetization is supposed to be strongest.

DETAILED DESCRIPTION OF THE PREFERRED EMBODIMENTS

There will be described a preferred embodiment of the present invention with reference to the drawings.

Figure 1:
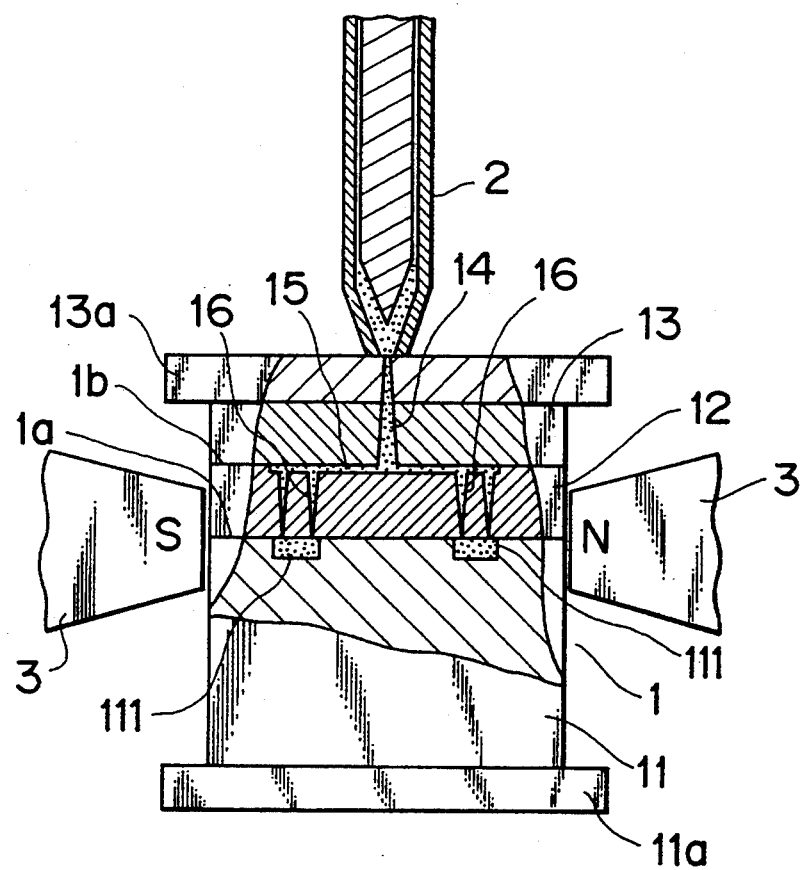
FIG. 1 is a partially sectional side view of a preferred embodiment of the manufacturing apparatus according to the present invention.

Referring to FIG. 1 which is a partially sectional side view of the magnetic plastic rotor disk manufacturing apparatus, reference numeral 1 generally designates a three-plate type mold for use as an injection mold. The three-plate mold 1 is composed of two retainer plates 11 and 12 between which a parting surface 1a is formed, and a single runner stripper plate 13 forming a runner moving surface 1b between the same and the retainer plate 12, wherein every time the mold 1 is opened to separate both the plates 12 and 13, the runner removing surface 1b is opened to remove a runner. Mounting plates 11a and 13a are provided to mount the retainer plate 11 and the runner stripper plate 13 to a molding machine (not shown), respectively.

The retainer plate 11 is formed on its upper surface, i.e., the parting surface 1a with a plurality of cavities 111 each having a predetermined depth for forming an outer circumferential surface and one of end surfaces of the magnetic plastic rotor disk having a flattened columnar shape. The mounting plate 13a and the runner stripper plate 13 are formed at their central portions with a sprue 14 for guiding a magnetic plastic material therethrough. A runner 15 is formed on an upper surface of the runner stripper plate 13, that is, on a butting surface between the runner stripper plate 13 and the retainer plate 12, for feeding the magnetic plastic material from the sprue 14 along the butting surface. Further, a plurality of pairs of pin gates 16 are formed in the retainer plate 12 for injecting the magnetic plastic material from the runner 15 to the cavities 111. That is, each pair of pin gates 16 are so formed as to correspond to each cavity 111 and form the opposite side of the end surfaces of the magnetic plastic rotor disk to be produced.

Each pair of pin gates 16 are preferably located at radially spaced positions such that each pin gate 16 is spaced by 0.5 r–0.8 r (r: radius of the magnetic plastic rotor disk) from the center of the magnetic plastic rotor disk. Thus, the pin gates 16 are connected at their small outlet points to the cavities 111. Therefore, when the mold 1 is opened, the runner can be easily stripped off from the moldings with less appearance of gate blush.

Reference numeral 2 designates an injection device for injecting the magnetic plastic material into the mold 1. Some preferred embodiments of the injection device 2 will be hereinafter described.

Reference numeral 3 designates a yoke around which a coil (not shown) is wound. The yoke 3 is so arranged as to surround the mold 1 along the parting surface 1a of the mold 1, so that a magnetic field to be generated by the yoke 3 may be applied to the material in the cavities 111 in one direction to thereby magnetize a magnetic powder contained in the material so that the particles of the magnetic powder are magnetized in the same magnetic orientation.

The magnetic plastic material contains synthetic resin as a matrix and the magnetic powder such as ferrite or rare earth elements. When the magnetic plastic material is injected from the injection device 2 into the closed mold 1, it is supplied through the sprue 14, the runner 15 and the pin gates 16 into the cavities 111. The magnetic powder in the magnetic plastic material is magnetized by the magnetic flux generated across the cavities 111 by the yoke 3, and is oriented in the same direction as a direction of the magnetic flux.

After the magnetic plastic material is hardened in the cavities 111, the mold 1 is opened by a driving mechanism (not shown) to cut off the sprue and runner at a portion of the pin gates 16. Then, the sprue and runner is separated together with the retainer plate 12 from the retainer plate 11. As a result, the magnetic plastic moldings are formed in the cavities 111, and they are ejected from the cavities 111 by ejector pins by moving an ejector plate (not shown).

The magnetic plastic rotor disk thus produced has magnetism in its diametrical direction. A gate blush remaining on one end surface of the magnetic plastic rotor disk is extremely small. Accordingly, it is unnecessary to conduct a gate cutting process and a gate blush removing process after molding the magnetic plastic material. As a result, it is unnecessary to remove the magnetism from the moldings in conducting the gate blush removing process and apply the magnetism to the moldings again after the gate blush removing process. In this manner, the moldings of the magnetic plastic material after being ejected from the cavities 111 can be utilized for products without any post-treatment.

In opening the mold 1, the retainer plate 12 and the runner stripper plate 13 are split from each other at the runner removing surface 1b formed therebetween, so that the sprue and runner may be removed from the retainer plate 12.

The orientation of the magnetism is not limited to the above-mentioned preferred embodiment, it may be suitably modified in accordance with the arrangement of the cavities, for example.

Figure 3:
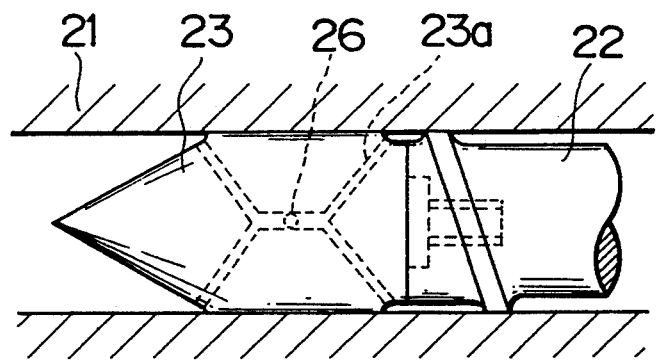
FIG. 2A, 2B and 3 are sectional views of some preferred embodiments of the injection device according to the present invention.
Figure 2A:
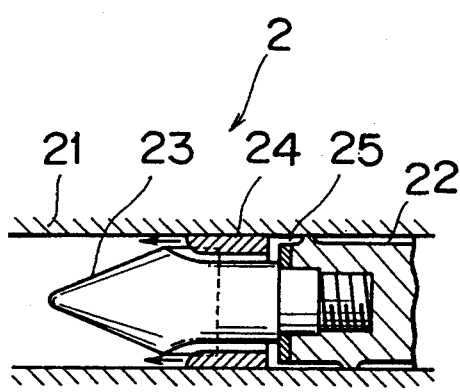
Figure 2B:
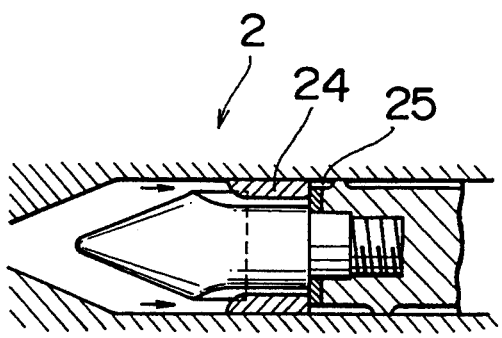
Figure 4:
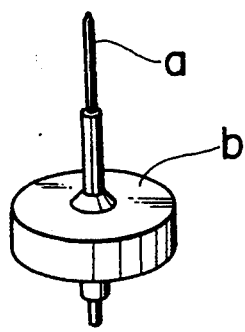
FIG. 4 is a perspective view of the magnetic plastic rotor disk to be produced by the magnetic plastic rotor disk manufacturing apparatus of the present invention.
Figure 5:
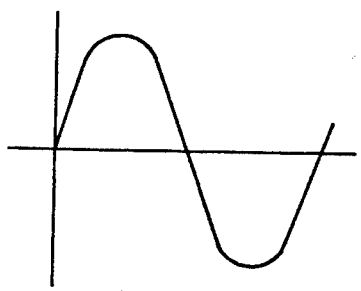
FIG. 5 is a waveform chart illustrating an ideal waveform of distribution characteristic of a magnetic flux density on a surface of the magnetic plastic rotor disk shown in FIG. 4.
Figure 6:
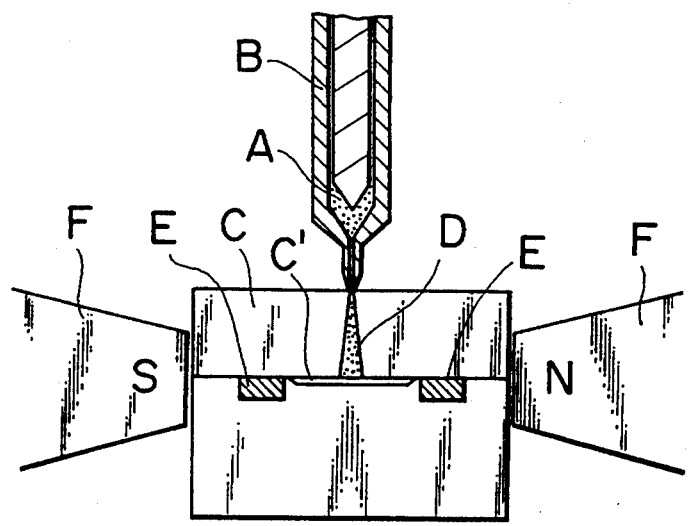
FIG. 6 is a sectional view of the conventional manufacturing apparatus.
Figure 7:
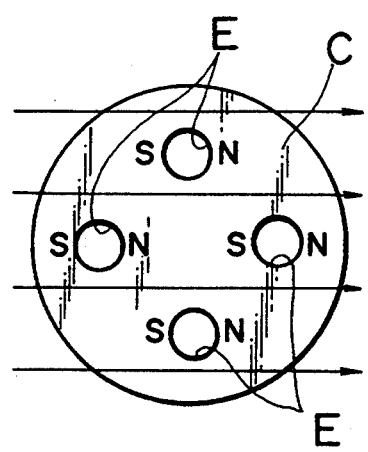
FIG. 7 is a plan view of a part of the manufacturing apparatus shown in FIG. 6.

FIGS. 2A, 2B and 3 show some preferred embodiments of the injection device 2 to be used with the magnetic plastic rotor disk manufacturing apparatus according to the present invention.

Referring first to FIGS. 2A and 2B, the injection device 2 is provided with a screw 22 adapted to be rotated and reciprocated in a cylinder 21, a screw head 23 fixed at its base to the screw 22 with a valve seat 25 interposed therebetween, and a backflow ring check valve 24 operatively mounted around the screw head 23. The check valve 24 serves to prevent backflow of a part of the magnetic plastic material through a screw channel of the screw 22 caused by a reaction of an injection force to be applied to the material upon injection of the material from a nozzle of the injection device 2.

In metering the material as shown in FIGS. 2A, the screw 22 is rotated to be retracted, and the material is accordingly fed through a gap defined between the valve seat 25 and the check valve 24. In injecting the material as shown in FIG. 2B, the check valve 24 is urged back by the reaction of the injection force applied to the material until the valve 24 abuts against the valve seat 25. Thus the gap between the check valve 24 and the valve seat 25 is closed to thereby prevent the backflow of the material.

Referring next to FIG. 3 which shows another type check valve, a ball check valve 26 is provided in the screw head 23 in such a manner that the ball check valve 26 is operatively moved in a hole 23a formed in the screw head 23.

In the above-mentioned preferred embodiment employing the pin gates 16 and accordingly necessitating the application of a large injection force to the material having a high viscosity and a low fluidity, the material tends to flow back because of the reaction of the injection force upon injection of the material. However, since the injection device 2 is provided with the check valve 24 or 26 for preventing the backflow of the material, a large injection force may be ensured to thereby greatly improve shot scattering. Therefore, the quality and magnetic characteristic of the moldings as well as the productivity may be improved.

By using the above-mentioned manufacturing apparatus, the magnetic plastic rotor disk having a diameter of 12 mm and a thickness of 3 mm was produced from a magnetic plastic material containing 12-nylon as the matrix and 89 wt. % of strontium ferrite as the magnetic powder under the injection condition of 53 g per shot. Also, the magnetic plastic rotor disk produced with the above-mentioned manufacturing apparatus is substantially solid (see, FIG. 1) or preferably has axial ends, each axial end being continuous from peripheral portions to a central portion thereof (see, FIGS. 1, 8B and 9B). The magnetic plastic rotor disk thus produced was compared with that produced by the conventional manufacturing apparatus employing a straight head screw, and various properties were evaluated as shown in Table below.

TABLE

| | Present invention | Prior Art |
|---|---|---|
| Waveform | ⊙ | ○ |
| Zero-cross position | ⊙ | ○ |
| Cushion quantity (g) | 10 | 0 |
| Metered quantity (g) | 63 | 77 |
| Shot scattering | ⊙ | Δ |
| Molding quality | ⊙ | ○ |
| Re-magnetization | unnecessary | necessary |
| Productivity | ⊙ | X |
| Production cost | ⊙ | Δ |

Although there has not been referred to a rotary shaft of the magnetic plastic rotor disk in the above-mentioned preferred embodiment, the rotary shaft may be mounted to the magnetic plastic rotor disk by insert molding.

Figure 8A:
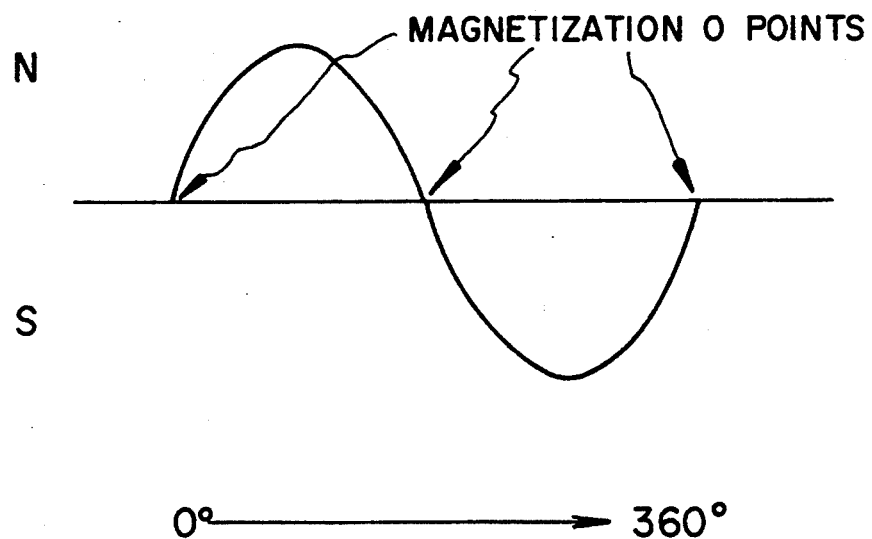
FIG. 8A is an illustration of the locations, in the magnetic plastic rotor disk (e.g., a two-pole magnet type) of this invention, where magnetization is supposed to be strongest.
Figure 8B:
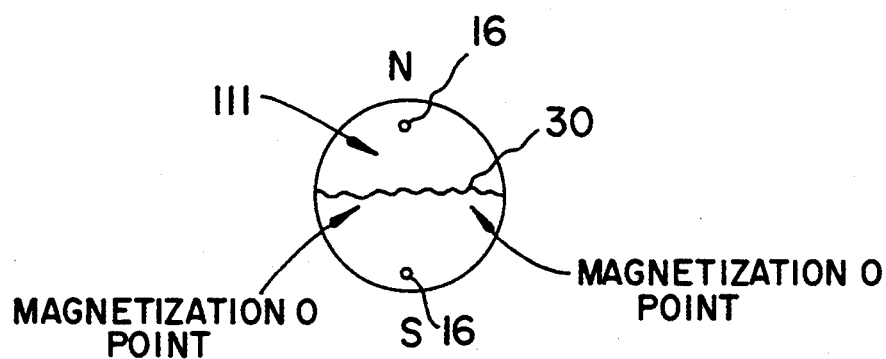
FIG. 8B is an illustration of the magnetic plastic rotor disk (e.g., a two-pole magnet type) of this invention showing that the pin gates are formed where magnetization is supposed to be strongest.
Figure 9A:
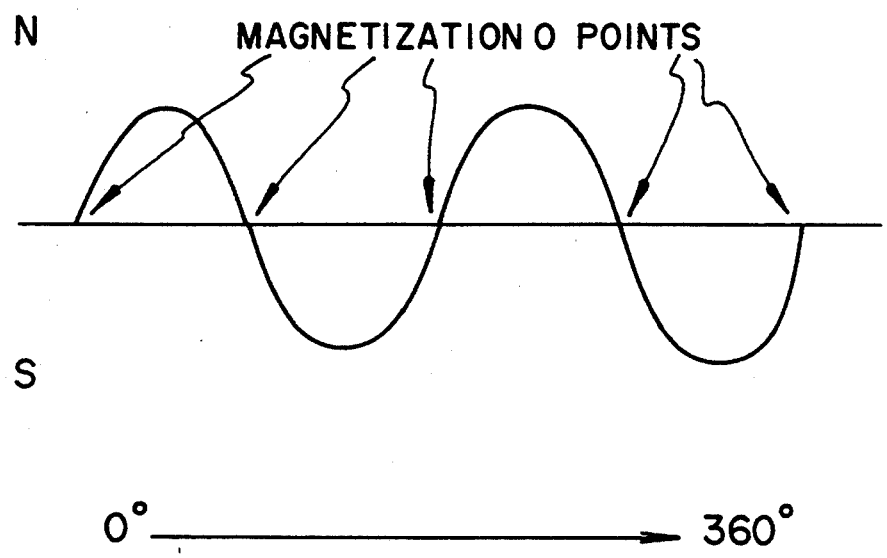
FIG. 9A is an illustration of the locations, in the magnetic plastic rotor disk (e.g., a four-pole magnet type) of this invention, where magnetization is supposed to be strongest.
Figure 9B:
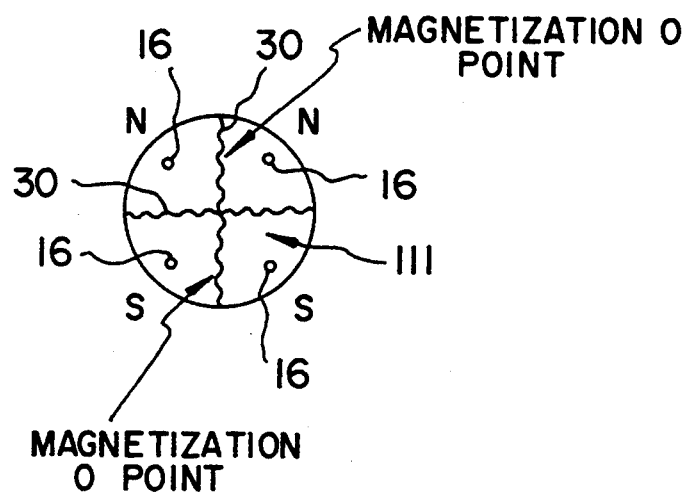

FIG. 8A is an illustration of the locations, in the magnetic plastic rotor disk (e.g., a two-pole magnet type) of this invention, where magnetization is supposed to be strongest; and FIG. 8B is an illustration of the magnetic plastic rotor disk (e.g., a two-pole magnet type) of this invention showing that the pin gates 16 are formed where magnetization is supposed to be strongest. FIG. 9A is an illustration of the locations, in the magnetic plastic rotor disk (e.g., a four-pole magnet type) of this invention, where magnetization is supposed to be strongest; and FIG. 8B is an illustration of the magnetic plastic rotor disk (e.g., a four-pole magnet type) of this invention showing that the pin gates 16 are formed where magnetization is supposed to be strongest. The magnetic plastic rotor disk manufacturing apparatus of this invention, thus, has the advantage and benefit of having the pin gates 16 being formed at positions where the magnetization of the rotor disk is supposed to be strongest. Furthermore, when the magnetic plastic material is injected into the cavities 111 through the pair of pin gates 16, the material flow is uniform in areas near the pin gates 16 in order to ensure uniform magnetization in the molding. On the other hand, a weld 30 is formed at an area where two streams of material flow from the pin gates 16 meet. Although the resin structure is not uniform at such an area, no problem exists because sufficient magnetization is not required there.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic plastic rotor disk manufacturing apparatus for manufacturing diametrically magnetized magnetic plastic rotor disks comprising:

an injection device for injecting a magnetic plastic material containing a synthetic resin matrix and a magnetic powder;

a mold for molding said magnetic plastic material injected thereinto from said injection device, said mold including a three-plate mold constructed of two retainer plates and a single runner stripper platen, one of said retainer plates being formed with a plurality of cavities, each cavity being of cylindrical configuration terminated by opposite axial end surfaces, the other retainer plate being formed with a plurality of pin gates directly abutting and directly communicating with said cylindrical cavities such that each pin gate directly supplies said magnetic plastic material through one of said opposite axial end surfaces into one of said cylindrical cavities, wherein said magnetic plastic material is molded, wherein said other retainer plate is formed with at least a pair of pin gates for each cavity such that said at least a pair of pin gates are arranged along said diameter along which said magnetic field is generated; and means for generating a magnetic field, positioned across said two retainer plates of said three-plate mold, for generating said magnetic field directly across said cavities of one of said retainer plates to magnetize said powder in a direction along a diameter of said magnetic plastic rotor disks, at least a pair of said pin gates being in direct connection with one of opposite axial end surfaces of one of said plastic rotor disks substantially at peripheral portions of one of said axial end surfaces, each of said axial end surfaces being continuous from said peripheral portions to a central portion thereof, wherein the other retainer plate is formed with said plurality of pin gates such that said plurality of pin gates are positioned where magnetization, generated by said magnetic field generating means, of each of said plastic rotor disks is at its strongest, wherein said injection device injects said magnetic plastic material such that a flow of said magnetic plastic material is uniform in areas near each of said plurality of pin gates to thereby ensure uniform magnetization in said mold, and wherein said injection device injects said magnetic plastic material such that a weld is formed at an area where streams of magnetic plastic material flow from said plurality of pin gates meet.

2. The magnetic plastic rotor disk manufacturing apparatus as defined in claim 1, wherein said injection device comprises a screw injection device having a screw head provided with a check valve for preventing backflow of said magnetic plastic material.

3. The magnetic plastic rotor disk manufacturing apparatus as defined in claim 1, wherein each cavity of cylindrical configuration is designed to produce a solid magnetic plastic rotor disk.

4. The magnetic plastic rotor disk manufacturing apparatus as defined in claim 1, wherein each of said magnetic plastic rotor disk is substantially 12 mm. in diameter, and substantially 3 mm. in thickness.

* * * * *